April 2, 1940.                     I. BEIN                     2,195,807
                           TAXIMETER-FLAG CONTROL
                   Filed Dec. 29, 1938          6 Sheets-Sheet 1
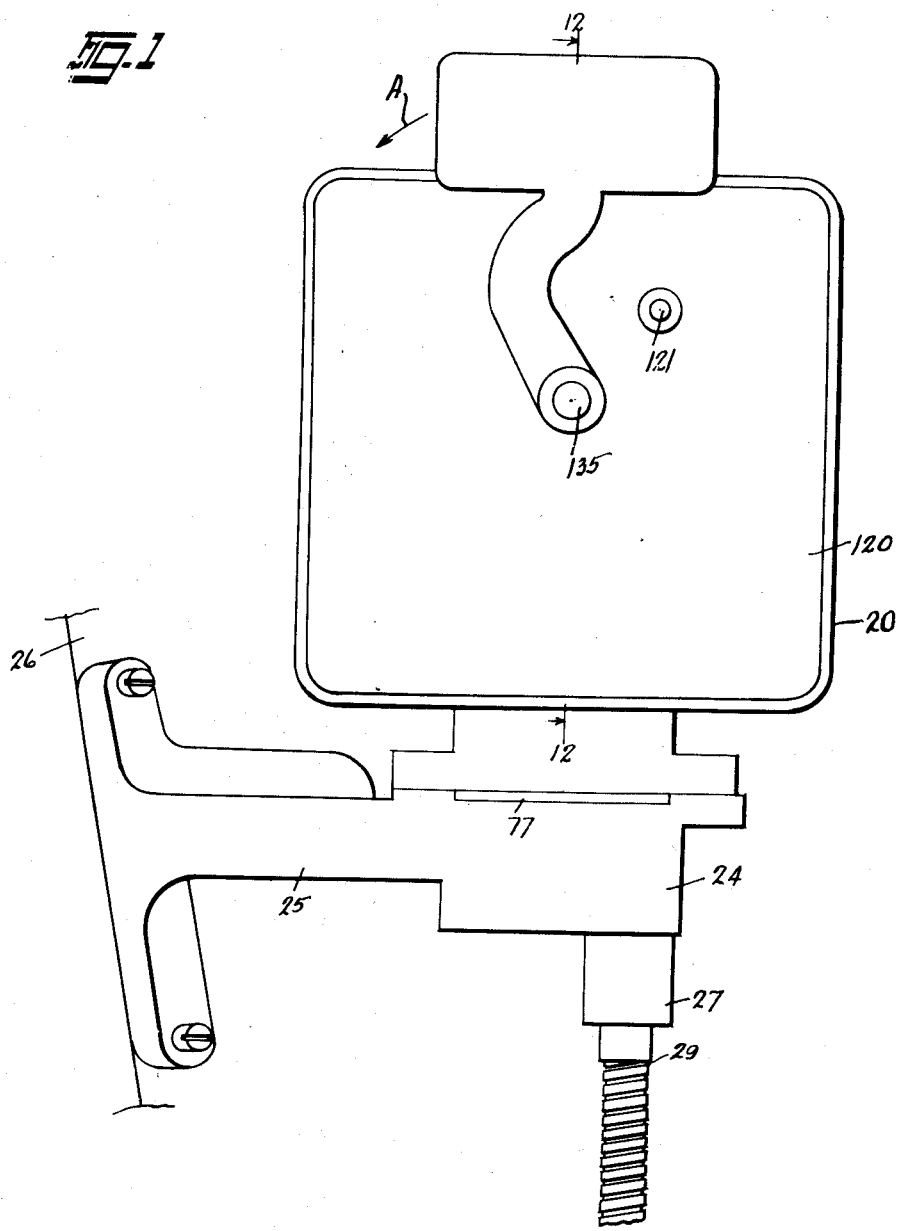
                                                    INVENTOR.
                                                  Isaac Bein
                                          BY
                                                    ATTORNEY.

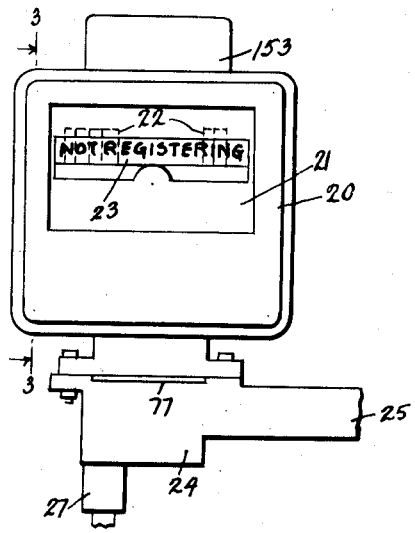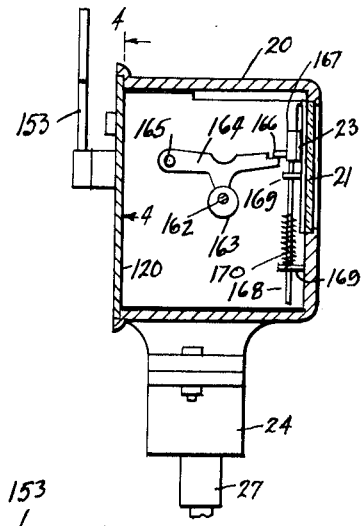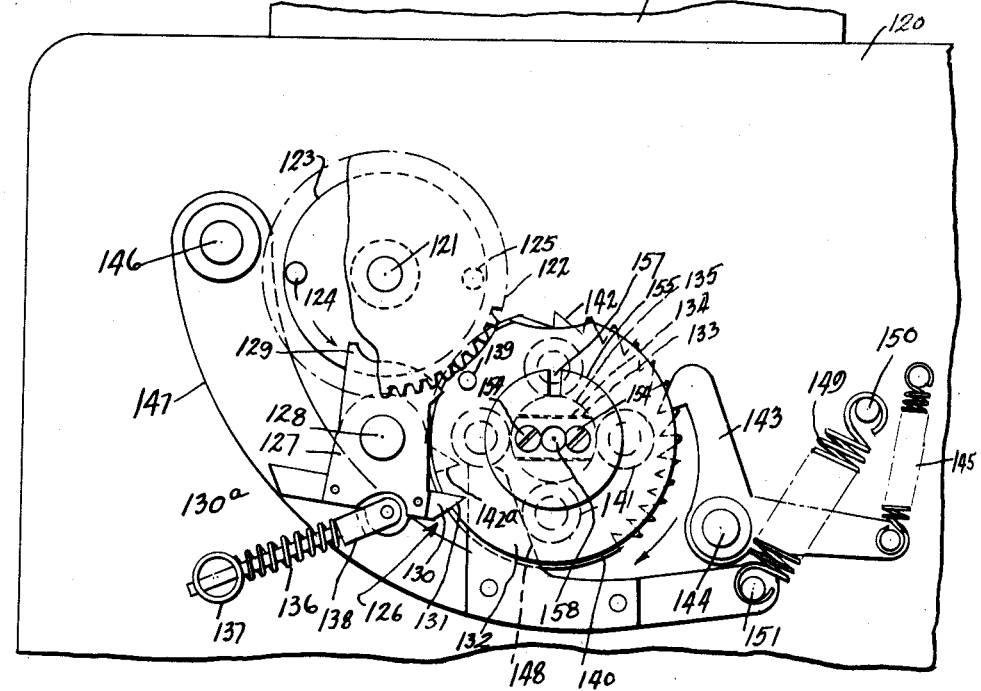

April 2, 1940.  I. BEIN  2,195,807
TAXIMETER-FLAG CONTROL
Filed Dec. 29, 1938   6 Sheets-Sheet 3
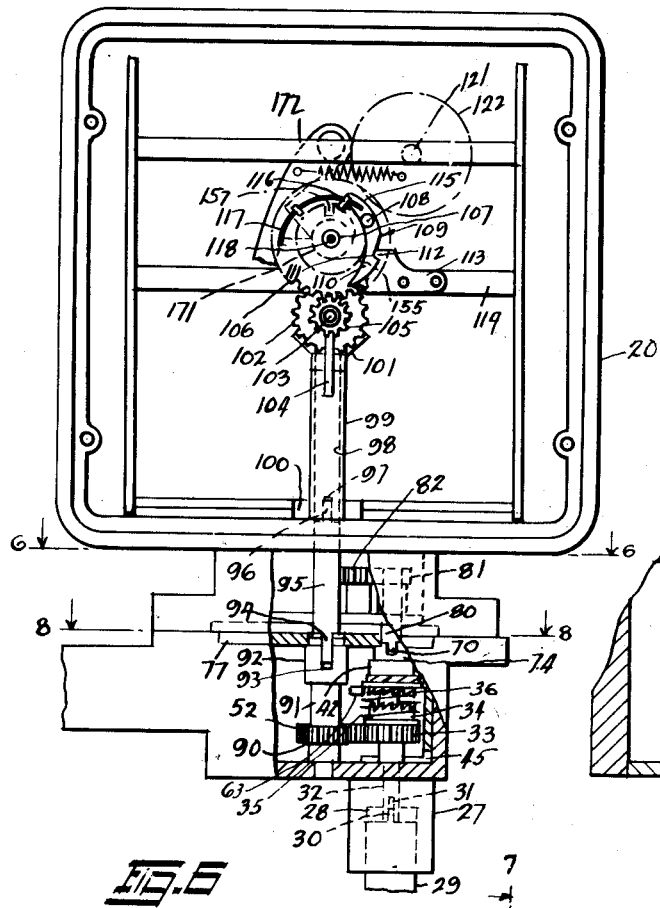
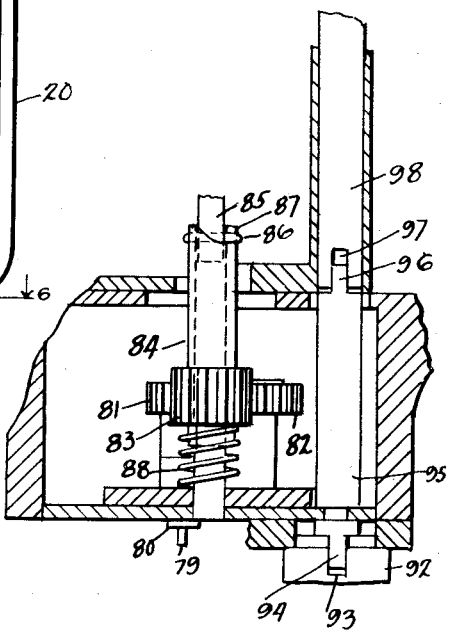
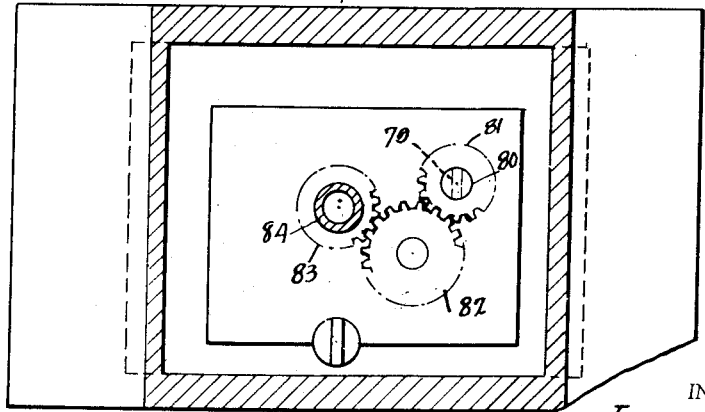
INVENTOR.
Isaac Bein.
BY
ATTORNEY.

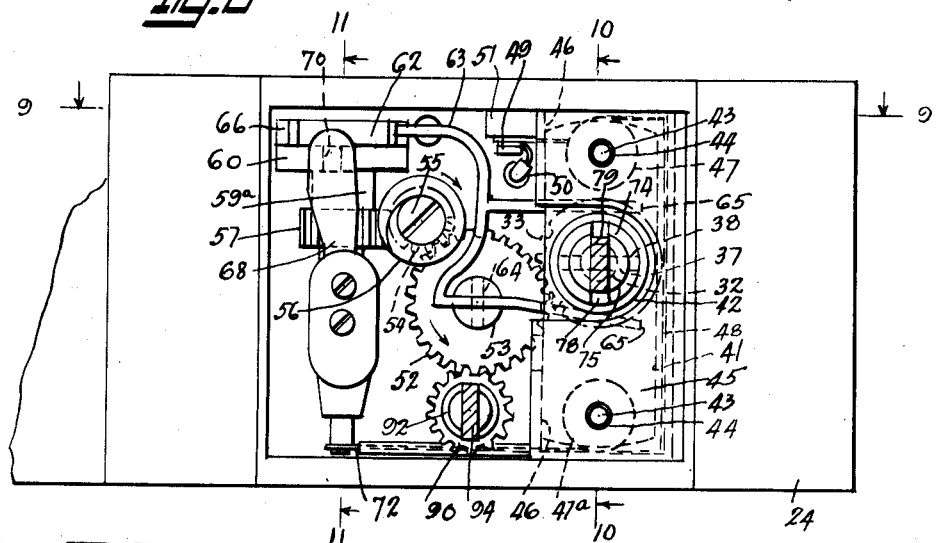
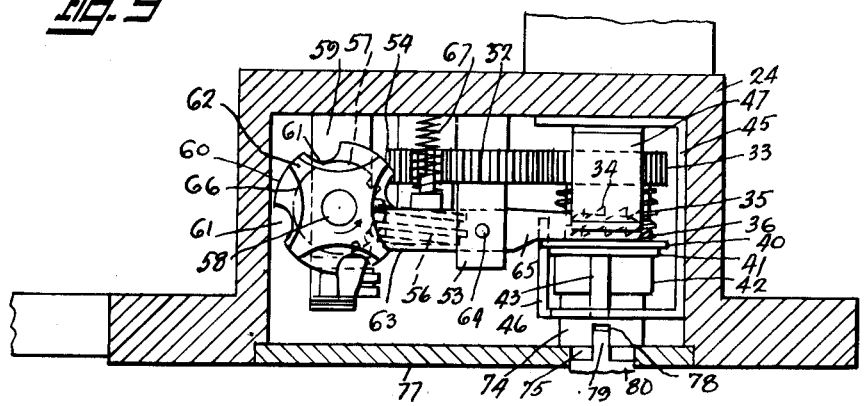
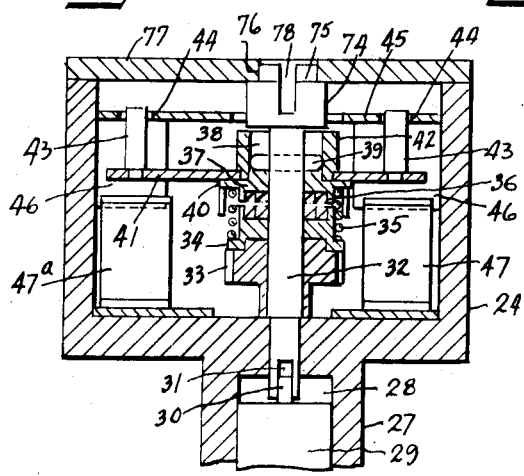
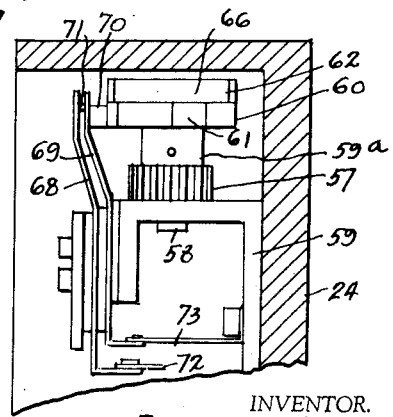

April 2, 1940.                I. BEIN                2,195,807
TAXIMETER-FLAG CONTROL
Filed Dec. 29, 1938            6 Sheets-Sheet 5
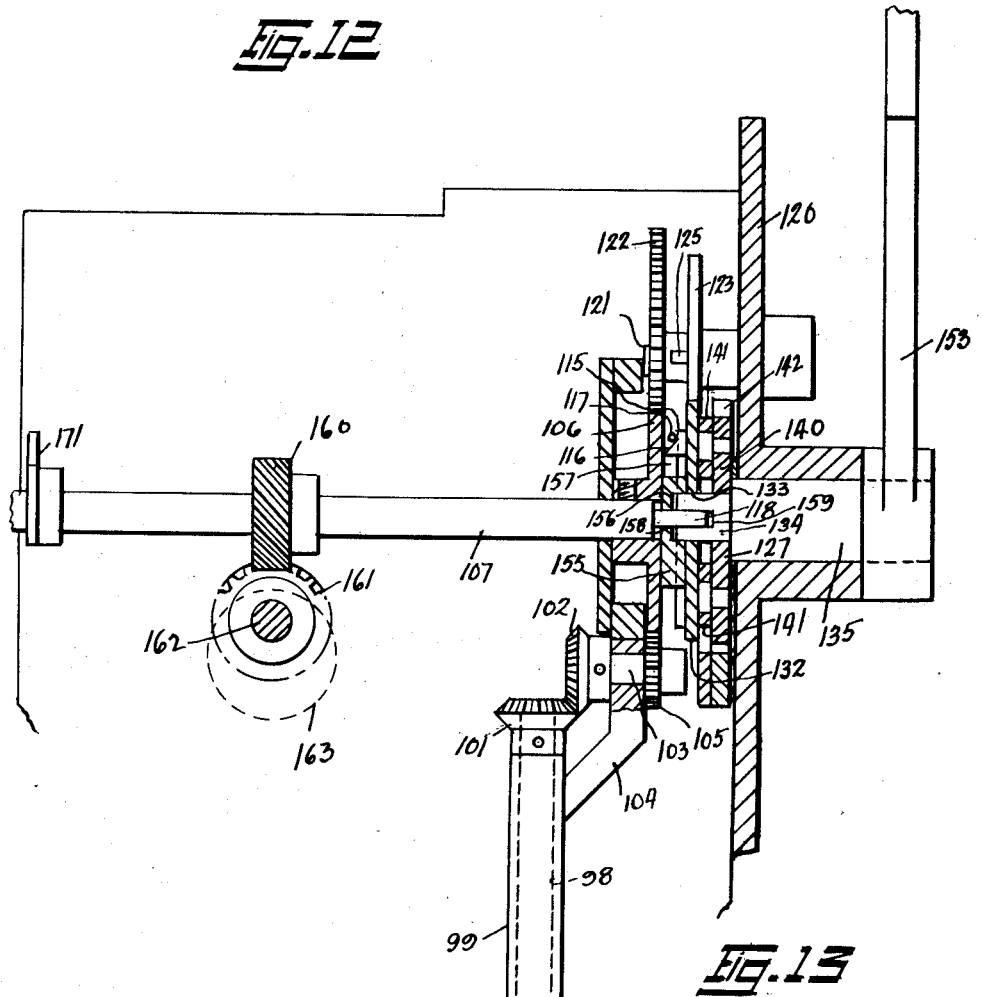
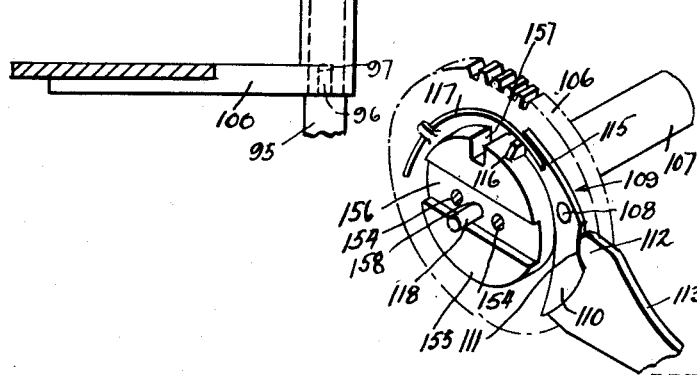
INVENTOR.
Isaac Bein
BY
ATTORNEY.

April 2, 1940.  I. BEIN  2,195,807
TAXIMETER-FLAG CONTROL
Filed Dec. 29, 1938      6 Sheets-Sheet 6
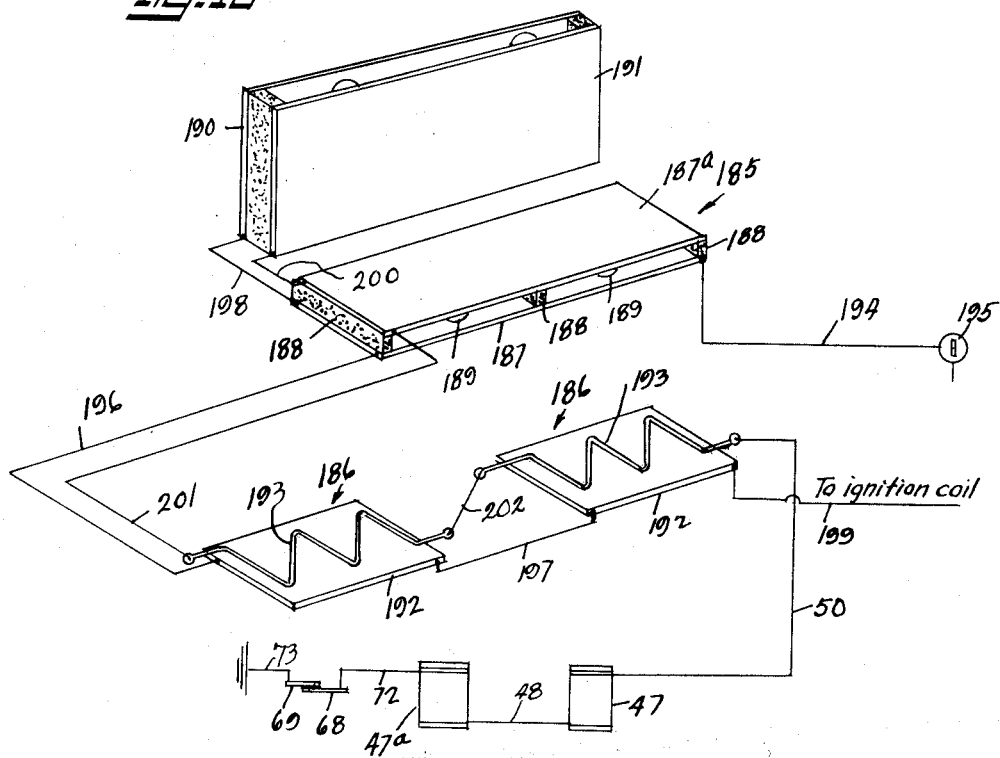
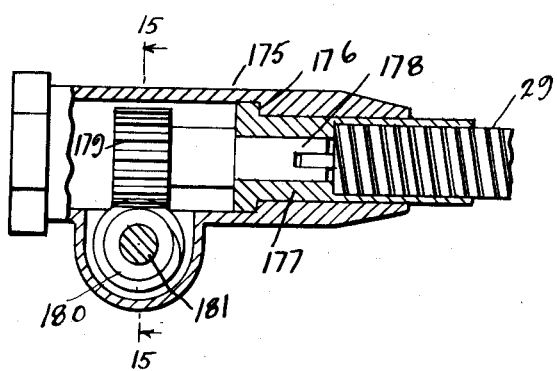
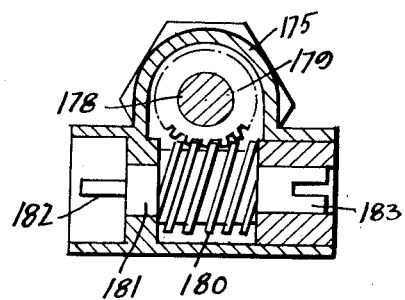
INVENTOR.
Isaac Bein
BY
ATTORNEY.

Patented Apr. 2, 1940

2,195,807

UNITED STATES PATENT OFFICE 2,195,807

TAXIMETER-FLAG CONTROL

Isaac Bein, Richmond Hill, N. Y.

Application December 29, 1938, Serial No. 248,265

10 Claims. (Cl. 235—30)

This invention relates to taximeters of the type generally used on cabs or other public conveyances, and more particularly to the flag operating mechanism of such taximeters.

One object of the invention is the provision of means whereby the taximeter flag can only be operated downwardly when the cab is occupied and in forward motion.

Another object of the invention is the provision of a normally open electric switch in each seat of the cab adapted to be closed when any of the said seats are occupied to set certain mechanism within the meter to operative position to release the flag operating mechanism upon forward movement of the taxi or cab so that the flag may be moved down by the taxi driver.

A further object of the invention is the provision of a taximeter having means of the nature referred to, said means being connected to the transmission and operated therefrom to release the flag operating means and to simultaneously lift the apron or shield covering the fare wheels or counters upon occupation and forward movement of the cab.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawings, in which—

Figure 1 is a rear view of a taximeter made in accordance with my invention;

Fig. 2 is a front view thereof at a reduced scale;

Fig. 3 is a sectional view taken on line 3—3 Fig. 2;

Fig. 4 is a front view of a portion of the flag operating mechanism carried on the rear plate of the taximeter, said view being taken with the rear plate removed and looking in the direction of the arrows 4—4 Fig. 3;

Fig. 5 is a rear view with the rear plate removed and portions of the lower casing broken away;

Fig. 6 is a sectional view taken on line 6—6 Fig. 5;

Fig. 7 is a sectional view taken on line 7—7 Fig. 6;

Fig. 8 is a sectional view taken on line 8—8 Fig. 5 showing in top plan view the controlling means of the flag operating mechanism;

Fig. 9 is a sectional view thereof taken on line 9—9 Fig. 8;

Fig. 10 is a sectional view taken on line 10—10 Fig. 8;

Fig. 11 is a fragmental sectional view taken on line 11—11 Fig. 8;

Fig. 12 is a fragmental sectional view taken on line 12—12 Fig. 1;

Fig. 13 is a fragmental perspective view of a portion of the flag operating mechanism;

Fig. 14 is a fragmental sectional view of the end of the flexible connection connecting the meter to the transmission;

Fig. 15 is a sectional view thereof taken on line 15—15 Fig. 14; and

Fig. 16 is a diagrammatic view of the electric connections from the source of supply to the seats and controlling mechanism.

Referring now to the drawings in detail in which only such mechanism of the meter is shown as is absolutely necessary to a clear understanding of my invention, 20 indicates the meter casing provided at the front thereof with a transparent window 21 through which the fare counters are visible when the vehicle is hired and in operation. In the present instance the meter is shown in normal idle or inoperative position and the counters 22 are shown as covered by a plate, apron or shield 23, the said plate being operated by means which will later be described.

Secured to the bottom of the meter casing 20 is a casing or housing 24 which forms the forward end of a supporting bracket 25 secured to the framework 26 of the cab. The lower forward end of the housing 24 is provided with an extension 27 having a bore or opening 28 therein and through which extends the forward end of a flexible shaft 29 having a tongue 30 which may be received in a slot 31 at the bottom of a stud 32, see Figs. 5, 8, 9 and 10. Loosely mounted on the stud 32 is a spur gear 33 carrying a toothed clutch member 34. Positioned above the said clutch member 34 and separated therefrom by a coiled spring 35 is a second clutch member 36 which is provided with a hub 37 having a cross slot 38 in which there slidingly fits a pin 39 driven through the stud 32.

The upper clutch member 36 is provided with an enlarged disc or shoulder portion 40 upon which rests a plate 41 having a hub 42 loosely fitting about the hub 37 of the clutch member 36. The plate 41 is further provided with a pair of upstanding pins 43 which extend upwardly through holes 44 in a frame 45 having depending guide portions 46. Supported upon the bottom wall of the frame 45 is a pair of spaced apart magnetic coils 47 and 47a which are connected in series by a wire 48 and which are connected to a binding post 49 to which electric current is supplied by a wire 50, the binding post being insulated from the casing 24 by means of an insulating block 51 (see Fig. 8).

In mesh with the clutch gear 33 is a gear 52 loosely mounted on the stud 53, the said gear 52 being in mesh with a pinion 54 loosely mounted upon a stud 55, the said pinion carrying a worm 56 at its upper end which is in mesh with and drives a gear 57 secured to a stud 58 rotatably supported in a bracket 59 which is secured to the housing 24. The gear 57 has a hub 59a which carries a disc 60 having four peripheral indentations or cutouts 61. The disc 60 is provided with an upper four-pointed cam 62 which cooperates with the forward end of a cam lever 63 pivotally supported at 64 on the stud 53 and which is provided with a bifurcated end 65 adapted for engagement with the upper clutch disc 40. The lever 63 is urged against the cutout cam portion 66 of the cam 62 by means of a spring 67. Secured to the bracket 59 and suitably insulated from each other are a pair of switch arms 68 and 69 respectively, the switch arm 69 having a pin or projection 70 in engagement with the disc 60 and the switch arm 68 is provided with a point 71 adapted when the pin 70 is in engagement with the high peripheral portion of the disc 60 to make electric contact with the switch arm 69. The arm 68 may be connected with a wire 72 to the coil 47a and the switch arm 69 may be grounded by means of a wire 73 to the casing 24.

The stud 32 is provided with a head 74 terminating in a reduced portion 75 which fits rotatably into an opening 76 in a plate 77 overlying and secured to the housing 24. The head 74 has a slot 78 into which fits a tongue 79 forming a part of a stud 80 at the upper end of which is secured a gear 81 (see Figs. 5, 6, 7, 8 and 9) in mesh with and driving an intermediate gear 82 which in turn is in mesh with a gear 83 to impart rotary motion thereto, the said gear having secured thereto a toothed sleeve 84 separably connected to a shaft 85 by means of a cross-pin 86 in the said shaft and in contact with the toothed portion 87 of the sleeve. The sleeve is forced upwardly against the pin 86 by means of a spring 88. The shaft 85 forms a part of the mileage control mechanism not shown as it forms no part of this invention.

The gear 52 is in mesh with a gear 90 secured to a stud 91 rotatably mounted in the housing 24, the said stud having a head 92 provided with a slot 93 into which fits the lower tongued end 94 of a stud 95 whose upper tongued end 96 fits into the slotted end 97 of a shaft 98 rotatably mounted in a tubular post 99 of a bracket 100 secured to the general interior frame work of the meter. The shaft 98 is provided at the top thereof with a bevel gear 101 in mesh with a second bevel gear 102 secured to a stud 103 rotatably mounted in an arm 104 of the bracket 100. Secured to the outer end of the stud 103 is a pinion 105 which is in mesh with a gear 106 secured to a shaft 107 which extends from the front to the rear of the meter. The gear 106 has pivotally secured thereto at 108 a lever 109 whose lower arm 110 is provided with a detent 111 normally in engagement with a tooth 112 of a plate 113 secured to a crossbar 114 forming a portion of the inner framework of the meter. The upper end 115 of the lever 109 is provided with a projection or dog 116 against which one end of a wire spring 117 exerts a tension to normally force the lever end 110 into locking engagement with the tooth 112. The shaft 107 is provided with a reduced end portion 118 which extends outwardly beyond the gear 106.

Removably secured to the rear of the casing 20 is a plate 120 in the upper portion of which there is secured a stud or short shaft 121 upon which is rotatably mounted a gear 122 of the same size as the gear 106 and in mesh therewith (see Figs. 4 and 12). The said gear 122 carries a rear plate 123 provided with two diametrically opposed pins 124 and 125 respectively. The pins 124 and 125 are adapted to operate a detent lever 126 as will later be described. The said lever comprises a plate 127 pivotally mounted on a stud 128 and provided at its upper end with a projection 129 in the path of the pins 124 and 125 and adapted to be engaged by same. The lower portion of the plate 127 may be provided with a detent tooth 130 which fits into a notch 131 in a plate 132 having a central cutout 133 to receive the reduced end 134 of a short shaft 135. The tooth 130 is releasably held in the notch 131 by means of a spring 136 exerting a tension between a post 137 and a bifurcated yoke member 138 pivotally secured to the lever 126. The plate 132 which carries a pin 139 is spaced from a disc or plate 140 by means of rollers 141. The plate or disc 140 is likewise mounted on the reduced shaft portion 134 and provided with ratchet teeth 142 in a portion of its periphery, the said teeth being engaged by a pawl 143 pivotally mounted at 144 and urged into engagement with the said teeth by a spring 145. Pivotally mounted at 146 is a rocker arm 147 having a cam plate 148 normally drawn into contact with two of the said rollers 141 by means of a spring 149 secured to a post 150 on the plate 120 and to a post 151 at the free end of the arm 147. The said cam plate 148 and the spring 149 act to tension the ratchet disc 140 and to position same properly with respect to the pawl 143.

Secured to the extreme outer end of the shaft 135 is the meter flag 153 and to the innermost reduced portion 134 of the said shaft there is secured by means of screws 154 a disc or collar 155 having an undercut slot 156 fitting over the said reduced extremity of the shaft. The said disc 155 is provided with a cutout 157 in its periphery, the object of which will presently be described. The said disc 155 is provided with a central opening 158 (see Figs. 4, 12 and 13) through which the reduced shaft portion 118 of the shaft 107 extends into an opening 159 in the reduced shaft end 134 for proper alinement therewith.

The shaft 107 carries intermediate its ends a spiral gear 160 which is in mesh with and drives a second spiral gear 161 upon a cross-shaft 162 which at one of its extreme ends carries a cam 163 (see Figs. 3 and 12) adapted to operate a rocker arm 164 pivoted at 165 and in engagement at its free end with a pin 166 extending from a block 167 to which one end of the counter wheel cover plate 23 is secured. Depending from the block 167 is a rod 168 guided in guides 169 and tensioned downwardly by means of a coiled spring 170. The shaft 107 is further provided with a cam 171 which is in engagement with a spring controlled arm 172 (see Figs. 5 and 12) which is normally, when the cab is not running for hire, in engagement with the clockworks of the meter (not shown) to act as a brake therefor.

The end of the flexible connection 29 which connects the meter to the transmission comprises a tubular housing 175 in which there is supported upon a shoulder 176 a bushing 177 which forms a bearing for a stud 178 to which is secured a gear 179 in mesh with a worm 180 mounted on a stud 181 one end of which has a flat portion or extension 182 adapted for engagement with the drive or transmission, not shown, and the opposite end is provided with a slotted extension 183 for connection with the speedometer.

Electrical means for controlling the operation of the taximeter flag from each of the cab seats is provided and comprises a switch 185 in the rear seat, and switches 186 in the folding forward seats of the cab. The switch 185 comprises a lower plate 187 and an upper resilient plate 187a, the said plates being insulated from each other by preferably resilient sponge rubber strips 188. If desirable, suitable contact strips or points 189 may be provided for the upper and lower plates. As an extra precautionary measure, back plates 190 and 191 may be provided. The switches 186 each comprise a lower plate 192 and an upper flat zig-zag spring 193 suitably spaced above the plate 192. One end of the lower plate 187 is connected by means of a lead wire 194 to the key switch 195 and the other end of the said plate is connected in series to one of the plates 192 by a wire 196, the plates 192 may be connected to each other by a wire 197 and then connected by a wire 199 to the ignition coil, one end of which, as is customary, being grounded. The rear plate 190 is connected by a wire 198 to the lower plate 187 of the rear seat. A wire 200 connects the upper plate 187a to the plate 191 and a wire 201 connects the said plate 187a to one of the upper springs 193, the said springs being connected in series by a wire 202 and the wire 50 connects the said springs 193 to the magnetic coil 47 which in turn is connected to the coil 47a by the wire 48. As previously described, the coil 47a is connected to the switch blade 68 by the wire 72 and the switch blade 69 is connected to the ground by the wire 73.

The operation of the device is as follows: Upon the seating of a passenger on any of the seats of the cab, contact is made between the upper and lower switch plates of the said seat to close the electric circuit and energize the coils 47—47a, causing the plate 41 to be drawn down and bring the teeth of the upper clutch 36 into engagement with the teeth of the lower clutch 34, so that when the stud 32 receives rotary movement from the transmission through the flexible connection 29, the gear 33 will drive the gear 52, which in turn will impart rotary movement to the stud 58 through the gear 54, worm 56 and gear 57. After a quarter turn of the stud 58, the pin 70 on the switch blade 69 will drop into one of the cutouts 61 in the disc 60 to break the electric circuit, disconnect the clutches 34 and 36 through the lever 65, cam 66 and disc 40, and stop the further movement of the gears.

Simultaneously with the above described action, the gear 90 will be rotated by the gear 52 and through the connections 91, 95 and 98, the bevel gears 101, 102 and pinion 105, will be rotated to drive shaft 107 through gear 106. Shaft 162 will be driven by the spiral gears 160 and 161, and cause the cam 163 to operate the lever 164 and raise the shutter 23 and maintain same in raised position. Likewise, during the said interval, the cam 171 will actuate the arm 172, release the clockwork mechanism and permit same to operate. The mileage control mechanism will operate in the usual manner through the gears 81, 82 and 83 and the connections 32, 80, 84, 85 and 86.

Likewise, during the time in which the clutches 34 and 36 are in mesh, the gear 122 will be driven to carry the disc 123 through one-half of a revolution so that the pin 124 will engage the projection 129 on the detent lever 126 to swing same about its pivot 128 to disconnect the tooth 130 from the cutout 131 in the detent disc 132 to release the flag operating mechanism. The movement of the lever 126 is limited in disengagement direction by the pin 139 on the disc 132 contacting the point 129 and by the outermost end 130a of the lever 126 contacting the periphery of the disc 123. The above contacts produce a click which apprise the operator that the flag is free to be turned down. It is also to be understood that the gear 106 will carry the lever 109 to a position 180 degrees from that shown in Figs. 5 and 13, the said lever being swung out of engagement with the tooth 112 by a camming action therebetween and the arm 110.

With the disc 132 disengaged or unlocked, the operator rotates the flag in the direction of the arrow A, Fig. 1, through an angle of one hundred and eighty degrees. In so doing, a notch 142a in the ratchet 140 is brought into releasable locking engagement with the tooth of the pawl 143 and the slot 157 is brought into a position one-half of a revolution from the position shown in Figs. 4, 5 and 13, and in which revolved position the projection or dog 116 will drop into the slot 157.

At the end of the ride and when the passenger leaves the cab, the driver returns the flag to its normal upward position; during the said operation, the pin 139 will contact the cam surface 127a and swing same back into normal position, so that the point 129 is in position to be engaged by the pin 125 on the next operation. The shaft 107 is brought back to normal position by the engagement of the dog 116 with the slot 157 in the moving disc 155, which is secured to the flag carrying shaft 135.

From the foregoing, it will be seen that I have provided means whereby the flag of a taximeter can be operated or turned down only when the cab is occupied and when in motion, so that a passenger may at any time before the cab starts to move, leave the cab without incurring the liability of a toll or fee.

Having described my invention, what I claim as new and desire to secure by Letters Patent is:

1. In a taximeter, a flag, means for normally locking the said flag against rotation, means for releasing said locking means, means for operating the releasing means, said operating means comprising a drive clutch member actuated by the taxi transmission, a second clutch member maintained in spaced relation to the drive clutch member, a normally open electric switch, a pair of magnetic coils in electric circuit with the switch adapted to bring the drive clutch member into engagement with the second clutch member when the switch is closed to complete the circuit, and mechanism geared to the driven clutch member to unlock the said flag locking means when the driven clutch is rotated.

2. In a taximeter, a flag, means for normally locking the said flag against rotation, means for releasing said locking means, means for operating the releasing means, said operating means comprising a drive clutch member actuated by the taxi transmission, a second clutch member maintained in spaced relation to the drive clutch member, a normally open electric switch, a pair of magnetic coils in electric circuit with the switch adapted to bring the drive clutch member into engagement with the second clutch member when the switch is closed to complete the circuit, mechanism geared to the driven clutch member to unlock the said flag locking means when the driven clutch is rotated, and means in electric circuit with the magnetic coils for breaking the electric circuit when the locking means is released.

3. In a taximeter, a flag, means for normally locking the said flag against rotation, means for releasing said locking means, means for operating the releasing means, said operating means comprising a drive clutch member actuated by the taxi transmission, a second clutch member maintained in spaced relation to the drive clutch member, a normally open electric switch, a pair of magnetic coils in electric circuit with the switch adapted to bring the drive clutch member into engagement with the second clutch member when the switch is closed to complete the circuit, mechanism geared to the driven clutch member to unlock the said flag locking means when the driven clutch is rotated, means in electric circuit with the magnetic coils for breaking the electric circuit, the said circuit breaking means including a two-bladed normally closed switch, a rotatably mounted serrated disc geared to the driven clutch member, and a projection on one of the blades adapted to enter one of the disc serrations to break the circuit when the locking means is released.

4. In a taximeter, a flag, means for normally locking the said flag against rotation, means for releasing said locking means, means for operating the releasing means, said operating means comprising a drive clutch member actuated by the taxi transmission, a second clutch member maintained in spaced relation to the drive clutch member, a normally open electric switch, a pair of magnetic coils in electric circuit with the switch, a plate overlying the said drive clutch member and the magnetic coils adapted to be drawn down by the magnetic coils to bring the clutch members into operative engagement when the switch is closed to complete the circuit, and mechanism geared to the driven clutch member to unlock the said flag locking means when the driven clutch is rotated.

5. In a taximeter, a flag, means for normally locking the said flag against rotation, means for releasing said locking means, means for operating the releasing means, said operating means comprising a drive clutch member actuated by the taxi transmission, a second clutch member maintained in spaced relation to the drive clutch member, a normally open electric switch, a pair of magnetic coils in electric circuit with the switch adapted to bring the drive clutch member into engagement with the second clutch member when the switch is closed to complete the circuit, mechanism geared to the driven clutch member to unlock the said flag locking means when the driven clutch is rotated, the said mechanism comprising a gear on the driven clutch member, a stud geared to the said clutch gear and driven therefrom, a shaft driven from the said stud, a rotatably mounted disc geared to the said shaft, and a pin carried by the said disc to engage the flag locking mechanism to release same when the driven clutch is rotated.

6. In a taximeter, a flag, a rotatable stud to which the flag is secured, a ratchet wheel secured to the said stud, a pivotally mounted spring urged pawl in engagement with the ratchet wheel, to maintain said wheel against rotation in one direction, a disc carried by the said ratchet wheel, a pivotally mounted spring pressed lever in locking engagement with the disc, a projection on the lever, a rotatably mounted disc, a pin on the disc in the path of the said projection, a taxi transmission actuated drive clutch member, a second clutch member maintained in spaced relation to the drive clutch member, a normally open electric switch, a pair of magnetic coils in electric circuit with the switch adapted to bring the clutch members into operative engagement when the switch is closed to complete the circuit, and gearing connecting the driven clutch member to the second mentioned rotatably mounted disc to bring the pin into engagement with the lock lever projection to disengage same from the ratchet wheel disc to permit the flag to be moved down.

7. In a taximeter, a flag, a rotatable stud to which the flag is secured, a ratchet wheel secured to the said stud, a pivotally mounted spring urged pawl in engagement with the ratchet wheel, to maintain said wheel against rotation in one direction, a disc carried by the said ratchet wheel, a pivotally mounted spring pressed lever in locking engagement with the disc, a projection on the lever, a rotatably mounted disc, a pair of pins on the disc in the path of the said projection, the said pins being spaced apart a distance of 180°, a cam surface on the said lever, a taxi transmission actuated drive clutch member, a second clutch member maintained in spaced relation to the drive clutch member, a normally open electric switch, a pair of magnetic coils in electric circuit with the switch adapted to bring the clutch members into operative engagement when the switch is closed to complete the circuit, a shaft rotatably mounted in the taximeter, a gear carried near one end of the said shaft, gearing connecting the driven clutch member to the gear on the said shaft, a gear carried by the rotatable disc and driven by the gear on the shaft to bring one of the pins into engagement with the lever projection to disengage same from the ratchet wheel disc to permit the flag to be rotated, a pivotally mounted spring pressed lever carried by the shaft gear, a dog at one end of the said lever, a collar secured to the flag stud, and provided with a slot adapted to be engaged by the dog when the said stud has been rotated through an arc of 180° and a pin on the ratchet wheel disc for engaging the cam on the lock lever to return same to normal position when the flag is rotated through a full circle.

8. In a taximeter, a flag, means for normally locking the said flag against rotation, means for releasing said locking means, means for operating the releasing means, said operating means comprising a drive clutch member actuated by the taxi transmission, a second clutch member maintained in spaced relation to the drive clutch member, a normally open electric switch, a pair of magnetic coils in electric circuit with the switch adapted to bring the drive clutch member into engagement with the second clutch member when the switch is closed to complete the circuit, mechanism geared to the driven clutch member to unlock the said flag locking means when the driven clutch is rotated, means in electric circuit with the magnetic coils for breaking the electric circuit when the locking means is released, and means for disengaging the clutch members when the circuit is broken.

9. In a taximeter, a flag, means for normally locking the said flag against rotation, means for releasing said locking means, means for operating the releasing means, said operating means comprising a drive clutch member actuated by the taxi transmission, a second clutch member maintained in spaced relation to the drive clutch member, a normally open electric switch, a pair of magnetic coils in electric circuit with the switch adapted to bring the drive clutch member into engagement with the second clutch member when the switch is closed to complete the circuit, mechanism geared to the driven clutch member to unlock the said flag locking means when the driven clutch is rotated, means in electric circuit with the magnetic coils for breaking the electric circuit, the said circuit breaking means including a two-bladed normally closed switch, a rotatably mounted serrated disc geared to the driven clutch member, a projection on one of the blades adapted to enter one of the disc serrations to break the circuit when the locking means is released, and means for disengaging the clutch members when the circuit is broken.

10. In a taximeter, a flag, means for normally locking the said flag against rotation, means for releasing said locking means, means for operating the releasing means, said operating means comprising a drive clutch member actuated by the taxi transmission, a second clutch member maintained in spaced relation to the drive clutch member, a normally open electric switch, a pair of magnetic coils in electric circuit with the switch adapted to bring the drive clutch member into engagement with the second clutch member when the switch is closed to complete the circuit, mechanism geared to the driven clutch member to unlock the said flag locking means when the driven clutch is rotated, means in electric circuit with the magnetic coils for breaking the electric circuit, the said circuit breaking means including a two-bladed normally closed switch, a rotatably mounted serrated disc geared to the driven clutch member, a projection on one of the blades adapted to enter one of the disc serrations to break the circuit when the locking means is released, means for disengaging the clutch members when the circuit is broken, said means comprising a pivotally mounted lever in operative engagement at one end thereof with the drive clutch, and a cam on the serrated disc in engagement with the opposite end of the said lever to rock same to separate the said clutch members when the circuit is broken.

ISAAC BEIN.